UNITED STATES PATENT OFFICE.

HEINRICH JORDAN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

BLUE TRISAZO DYE.

1,010,433.     Specification of Letters Patent.     Patented Dec. 5, 1911.

No Drawing.     Application filed January 4, 1911. Serial No. 600,818.

*To all whom it may concern:*

Be it known that we, HEINRICH JORDAN and WILHELM NEELMEIER, doctors of philosophy, chemists, citizens of the German Empire, residing at Leverkusen, near Cologne, Germany, have invented new and useful Improvements in Blue Trisazo Dye, of which the following is a specification.

The present invention relates to the manufacture and production of new azo dyestuffs which are obtained by combining the diazo compounds prepared from 5-amino-2-acidylamino-1-phenol ethers of the formula:

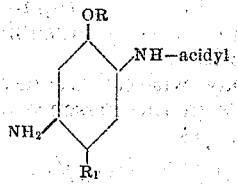

(R meaning an alkyl, *e. g.* methyl or ethyl, $R_1$ meaning a substituent, such as chlorin, alkyl) with 1-naphthylamin-6- or 7-sulfonic acid (or a mixture of these acids), rediazotizing the aminoazo compounds thus obtained, combining the diazoazo compounds with a second molecule of one of these acids (or of a mixture of the same), rediazotizing the aminodisazo compounds thus produced and combining the diazodisazo compounds with a naphthol sulfonic acid, especially 1.3- and 2.7-naphthol sulfonic acid and finally eliminating the acidyl radical by saponification. Blue cotton dyestuffs are thus obtained; they are after being dried and pulverized dark powders soluble in water generally with a blue coloration. Upon treatment with stannous chlorid and hydrochloric acid they are split up, a 2.5-diaminobenzene derivative of the formula

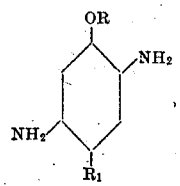

1.4-naphthylenediamin sulfonic acid and an aminonaphthol sulfonic acid are obtained. They can be diazotized on the fiber and developed *e. g.* with beta-naphthol the result being bright shades of excellent fastness to washing which can be discharged with hydrosulfite to a pure white.

In order to illustrate the new process more fully the following example is given, the parts being by weight: 245 parts of 2-oxalyl-amino-4-chloro-5-amino-1-anisol

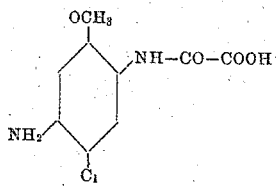

are dissolved in 7000 parts of water with the addition of 65 parts of sodium carbonate and are after acidulation with 350 parts of hydrochloric acid (19° Bé.) diazotized at about 15–20° C. with 69 parts of sodium nitrite. The diazo solution is combined with a solution of 245 parts of 1-naphthylamin-6-sulfonic acid (sodium salt) containing 220 parts of acetate of sodium (100 per cent.), the combination takes place within a few minutes. The mixture is rendered alkaline, mixed with 69 parts of sodium nitrite and then diazotized by adding at 10–15° C. the requisite quantity of hydrochloric acid. The diazotization is complete after stirring for 1 to 2 hours and the resulting diazo compound is then again combined in the presence of 280 parts of sodium acetate with 1-naphthyl-amin-6-sulfonic acid which requires a stirring of the mixture for about 12 hours at 10–15° C. The second intermediate product is filtered, dissolved in 10,000 parts of water containing 70 parts of sodium carbonate. 69 parts of sodium nitrite are added and finally after cooling to zero sufficient hydrochloric acid to produce diazotization. The diazodisazo compound which separates as a sandy powder is added to an aqueous solution cooled to 0° C. of 246 parts of 1-naphthol-3-sulfonic acid (sodium salt) containing an excess of carbonate of sodium. The dye is precipitated with salt, filtered, redissolved and then heated to boiling for about 10 minutes with 1600 parts of NaOH (30 per cent.) to eliminate the acidyl group. After cooling to 70° C. sulfuric or hydrochloric acid is added to neutralize the excess of caustic soda and the dye is then isolated in the usual manner. It is after being dried and pulverized a dark powder soluble in water with a blue coloration and yielding upon reduction with stannous chlorid and hydrochloric acid 2.5-diamino-4-chloro-1-anisol, 1.4-naphthylenediamin-6-sulfonic acid and 1-naphthol-2-amino-3-sulfonic acid. It dyes cotton in blue shades, which when diazotized on the fiber and developed with beta-naphthol change into a greenish-blue of excellent fastness to washing and to light. It can be discharged to a pure white with hydrosulfite.

Instead of 2-oxalylamino-4-chloro-5-amino-1-anisol other acidyl compounds, e. g. 2-formylamino-4-methyl-5-amino-1-anisol or the corresponding phenetols etc. can be used, and instead of 2.7-naphthol sulfonic acid the 1.3-naphthol sulfonic acid, and instead of the 1.6-, the 1.7-naphthylamin sulfonic acid or a mixture of the 1.6- with the 1.7-naphthylamin sulfonic acid may be used.

We claim:—

1. The herein described trisazo dyestuffs obtainable from a compound of the formula

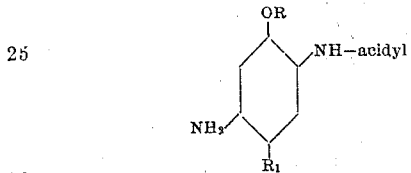

in which formula R means an alkyl group and $R_1$ a substituent, which dyestuffs are after being dried and pulverized dark powders soluble in water generally with a blue coloration; yielding upon treatment with stannous chlorid and hydrochloric acid a 2.5-diaminobenzene derivative, 1.4-naphthylenediamin sulfonic acid and an aminonaphthol sulfonic acid; which dyes can be diazotized on the fiber and developed with beta-naphthol giving bright shades of excellent fastness to washing which can be discharged with hydrosulfite to a pure white, substantially as described.

2. The herein described new trisazo dyestuff obtainable from a compound of the formula

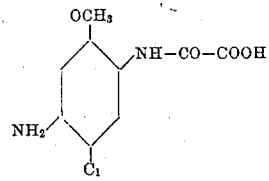

two molecules of 1-naphthylamin-6-sulfonic acid and 1-naphthol-3-sulfonic acid, which dyestuff is after being dried and pulverized a dark powder soluble in water with a blue coloration; yielding upon reduction with stannous chlorid and hydrochloric acid 2.5-diamino-4-chloro-1-anisol, 1.4-naphthylenediamin-6-sulfonic acid and 1-naphthol-2-amino-3-sulfonic acid; dyeing cotton in blue shades, which when diazotized on the fiber and developed with beta-naphthol change into a greenish-blue which can be discharged to a pure white with hydrosulfite, substantially as described.

In testimony whereof we have hereunto set our hands in the presence of two subscribing witnesses.

HEINRICH JORDAN. [L. S.]
WILHELM NEELMEIER. [L. S.]

Witnesses:
 CHAS. J. WRIGHT,
 ALFRED HENKEL.